(12) United States Patent
Wan et al.

(10) Patent No.: US 7,996,610 B2
(45) Date of Patent: Aug. 9, 2011

(54) TRANSPARENT BACKUP SERVICE FOR NETWORKED COMPUTERS

(75) Inventors: Charles Q. Wan, San Jose, CA (US); Mark D. Klein, Los Altos, CA (US)

(73) Assignee: Charles Qi Wan, San Jose, CA (US)

( * ) Notice: Subject to any disclaimer, the term of this patent is extended or adjusted under 35 U.S.C. 154(b) by 411 days.

(21) Appl. No.: 11/676,760

(22) Filed: Feb. 20, 2007

(65) Prior Publication Data

US 2007/0204104 A1    Aug. 30, 2007

Related U.S. Application Data

(60) Provisional application No. 60/774,791, filed on Feb. 17, 2006.

(51) Int. Cl.
*G06F 12/00* (2006.01)
(52) U.S. Cl. ............ 711/114; 711/161; 711/162; 714/2
(58) Field of Classification Search .................. 711/114, 711/161, 162; 714/2
See application file for complete search history.

(56) References Cited

U.S. PATENT DOCUMENTS

| | | | | |
|---|---|---|---|---|
| 6,658,540 | B1* | 12/2003 | Sicola et al. | 711/162 |
| 7,120,691 | B2* | 10/2006 | Goodman et al. | 709/225 |
| 7,337,331 | B2* | 2/2008 | Yoshida | 713/193 |
| 7,356,728 | B2* | 4/2008 | Tawil et al. | 714/5 |
| 2003/0018712 | A1* | 1/2003 | Harrow et al. | 709/203 |
| 2004/0158687 | A1* | 8/2004 | Yang | 711/162 |

* cited by examiner

*Primary Examiner* — Matthew Bradley

(57) ABSTRACT

In a specific embodiment, the present invention provides a method of providing transparent file backup service based on networked computers. The method includes establishing an online redundant array of independent disks (RAID) of a plurality of networked computers maintained by a central service controller on a server. The plurality of networked computers belong to one or more subscribed users. The method further includes storing backup files of each subscribed user on the online RAID. Each subscribed user dedicating at least a portion of storage spaces on corresponding computers to the online RAID for backup files of one or more alternative subscribed users. The central service controller in conjunction of a client software running on each user's computer is configured to coordinate backup file distribution and restoration.

14 Claims, 2 Drawing Sheets

TRANSPARENT BACKUP SERVICE FOR NETWORKED COMPUTERS

CROSS-REFERENCES TO RELATED APPLICATIONS

This application claims priority to U.S. Provisional Patent Application No. 60/774,791, filed on Feb. 17, 2006, entitled "Transparent Backup service," by inventors Charles Q. Wan and Mark D. Klein, incorporated by reference herein for all purposes.

STATEMENT AS TO RIGHTS TO INVENTIONS MADE UNDER FEDERALLY SPONSORED RESEARCH AND DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

The embodiments of the present invention relate generally to technique including a method for providing a transparent backup service for networked computers.

As personal computers have become more and more pervasive into everyday work and personal life, users have entrusted their personal computers to store a growing percentage of their important information. This information, or 'content,' takes the form of data files consisting of correspondence, tax returns, spread sheets, presentations other documents, photographs, music files, and the like.

Over the past 15 years, the growing storage and processing capabilities of personal computers has allowed, and even invited, users to abandon the storage of hard-copy and offline documents in favor of on-line storage in their personal computers. Personal computers have also become very reliable, often lasting their entire useful life without data loss.

As a result, most personal computer users have not experienced data loss resulting from a hard drive crash, operating system problem, file corruption, and the like.

Nevertheless, the possibility of such loss exists, and many users are unaware of the potential vulnerability of their stored data.

Other threats to electronically-stored data exist as well, such as for example viruses, worms and other malicious programs that spread readily among Internet-connected personal computers.

Few users perform routine backups of their stored information. Even among those who do, there is growing complacency toward the need to perform them. Also, an increasing number of users are not technically savvy enough to back up their information, or even locate it within the file system of their computer.

Existing backup solutions require the user to copy files to an external storage medium such as CD/Data-DVD, an external device, or other hard-capacity data storage device. The backup process may be performed manually, or may be scheduled to be automatically performed at regular intervals; in either case, such backups require the user to manage media and take the appropriate steps when media fills up. On-line services exist, but require technical sophistication to use. Existing solution can be so complex that even an experienced user, such as a system administrator, can overwrite critical data files. Most importantly, for average computer users, the conventional solution provides little or no help at all in case of file loss. This file loss can be due to hard drive failure, operating system failure, malicious software execution, computer loss due to the theft or disaster, accidental erasure, or any other event that causes the original file to be unusable.

From the above, it is seen that a simple fault-tolerant solution is desired for the average computer user, possibly requiring little or no configuration or administration, to backup and restore critical files in case of file loss.

BRIEF SUMMARY OF THE INVENTION

The embodiments of the present invention relate generally to technique including a method for providing a transparent backup service for networked computers.

Certain embodiments provide a simple fault-tolerant solution for the average computer user, possibly requiring little or no configuration or administration, to back up and restore critical digital files in case of file loss caused by hard drive failure, operating system failure, malicious software execution, computer loss due to theft or disaster, accidental erasure, or any other event that causes the original file to be unusable.

In a specific embodiment, the present invention provides a method of providing transparent file backup service based on networked computers. The method includes establishing an online redundant array of independent disks (RAID) of a plurality of networked computers maintained by a central service controller on a server. The plurality of networked computers belong to one or more subscribed users. The method further includes storing backup files of each subscribed user on the online RAID. Each subscribed user dedicating at least a portion of storage spaces on corresponding computers to the online RAID for backup files of one or more alternative subscribed users. The central service controller in conjunction of a client software running on each user's computer is configured to coordinate backup file distribution and restoration.

In one embodiment, a mixture of peer-to-peer (P2P) hard drive storage and online storage cache is used to store a user's documents for backup purposes. In another embodiment, the user documents can be encrypted and compressed before being sent out to their destination. The portion of the hard drive used for backup purposes on each user's computer can be partitioned so that it is not visible to this user to ensure high security of the backup files belonging to other users. Certain embodiments of the present invention can use a combination of distributed online hard drive space and/or centralized storage. The file backup service not only can be applied by individual computer user for any personal file backup purposes but also can be run as an enterprise solution administered by a company's internal Information Technology department. All user data, in this case, is stored within a company's firewall.

Various additional objects, features and advantages of the present invention can be more fully appreciated with reference to the detailed description and accompanying drawings that follow.

DETAILED DESCRIPTION OF THE INVENTION

The embodiments of the present invention relate generally to technique including a method for providing a transparent backup service for networked computers.

According to certain embodiments of the present invention, a transparent backup service (service), also called "online redundant array of independent disks (Online RAID)", automatically and without user initiation or intervention, stores copies of a user's information redundantly on other devices distinct from the user's personal computer or device. The backup copies are stored in either a central data store connected over a network or Internet and/or on other user's personal computers. In one embodiment, part of a user's hard drive is dedicated for storage of backup information from other user's personal computers. In another embodiment, this backup information is encrypted and its allocation and distribution is coordinated by a central service controller on a server in conjunction with a client software running on each user's personal computer. This solution can use a combination of distributed online hard drive space and centralized storage.

Figure 1:
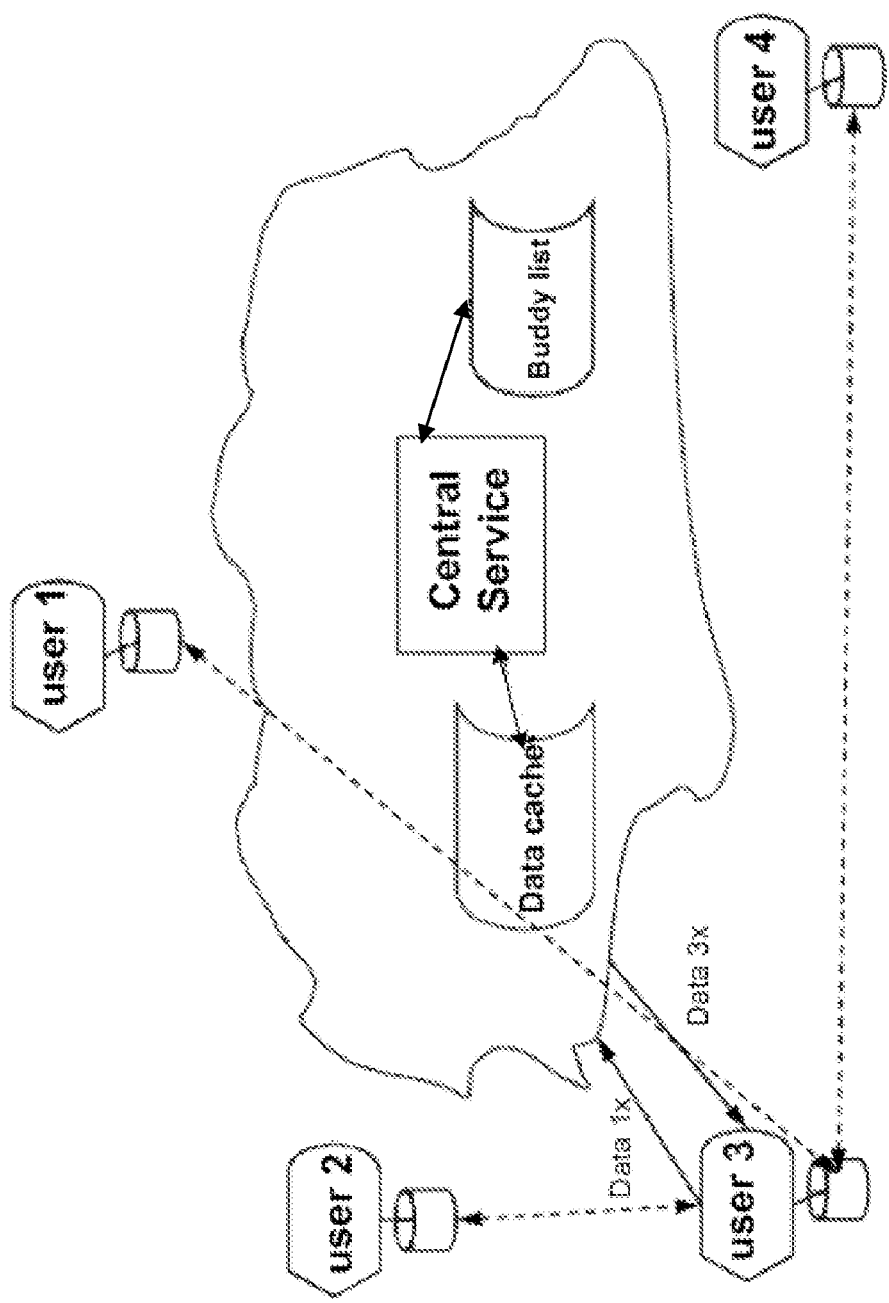
FIG. 1 is a simplified diagram illustrating a functional architecture for providing transparent file backup service based on networked computers according to an embodiment of the present invention.

FIG. 1 is a simplified diagram illustrating a functional architecture for providing transparent file backup service based on networked computers according to an embodiment of the present invention. This diagram is merely an example, which should not unduly limit the scope of the claims herein. One of ordinary skilled in the art would recognize many variations, alternatives, and modifications. Further detail of the present invention can be found throughout the present specification and more particularly below.

As shown in FIG. 1, a central service controller, a software running on a central server, coordinates backup and restore activities based on a buddy list. The buddy list is a list of user-designated friends/relatives/multiple computers who may also be users subscribed the service. In one embodiment, the buddy list can be generated during the subscription by each user through running a client software on corresponding user's computer. In another embodiment, the user's data is stored on those computers on the buddy list designated by the corresponding user. If the user does not provide such a list, or if the buddy list does not provide sufficient storage space, in one embodiment, the service is capable of finding and designating other storage space as needed (and subject to the user's approval). In yet another embodiment, a buddy list is not used, and data is stored on other computers as designated by the service.

In one embodiment, a mixture of peer-to-peer (P2P) hard drive storage and online storage (cache) is used to store a user's documents for backup purposes. Users, who decide to subscribe the file backup service, contribute excess hard drive space to the storage spaces of the online RAID for storing backup files belonging to one or more alternate users in return for distributed storage of their own files on the portion of the online RAID that is distinct from their own computers. All the stored backup documents can be encrypted and compressed. The portion of the hard drive used for backup purposes on each user's computer can be partitioned so that it is not visible to the corresponding user, because the portion of the hard drive has been dedicated for backup file of other users.

In one embodiment, a backup client, a client software loaded on each user's own personal computer (PC), runs when the user's PC and Internet connection is idle. The backup client copies files or parts of files to other storage resources on the Internet. A log file is kept to verify backup/restore progress.

Figure 2:
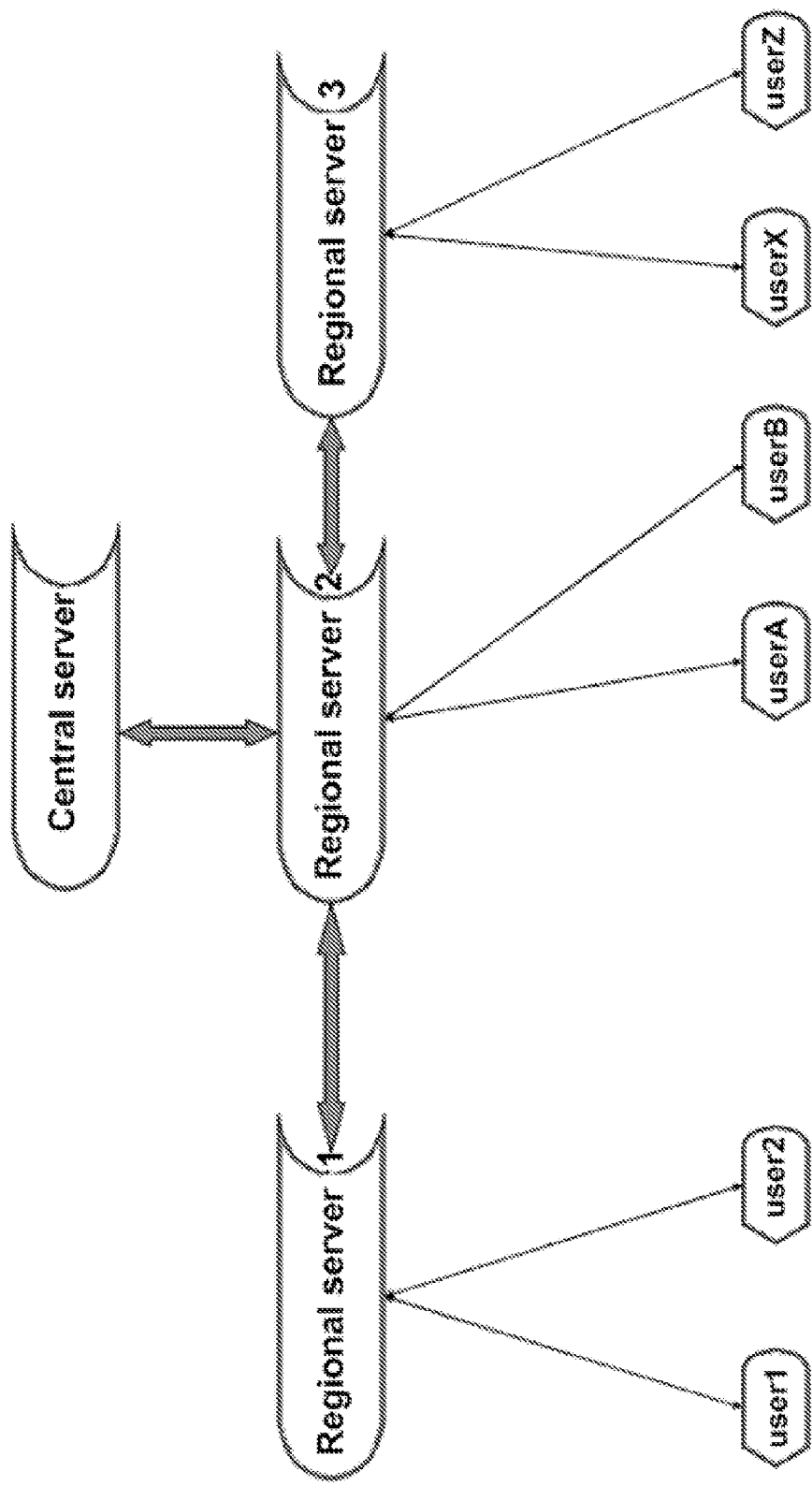
FIG. 2 is a simplified diagram illustrating an example of a server arrangement for transparent file backup service according to an embodiment of the present invention.

FIG. 2 is a simplified diagram illustrating an example of a server arrangement for transparent file backup service according to an embodiment of the present invention. This diagram is merely an example, which should not unduly limit the scope of the claims herein. One of ordinary skilled in the art would recognize many variations, alternatives, and modifications.

As shown in FIG. 2, the topology of a network providing the file backup service may be divided into different regions. The regions may correspond, for example, to geographic areas. In one embodiment, each regional network has a regional server. The regional servers serve as coordinators for transparent file backup services provided to the users within the corresponding regional networks. In another embodiment, these regional servers also participate in a central server's buddy list to mutually backup each other, ensuring that the service is virtually non-disruptive. To increase security of user data in the case of disasters such as earthquake, hurricane, war, and the like, buddy list can be chosen so that the buddies on the list are spread around different regional servers. Thus, the regional servers form a layer of P2P/central server networks themselves to ensure data security.

Certain embodiments of the present invention take advantage of the ubiquity of Internet connectivity and the general availability and inexpensiveness of hard drive storage space (resulting in most users having excess hard drive capacity). The service can store one user's data on one or more other users' personal computers, thereby spreading the risk of loss much like insurance spreads the risk among policy holders. In this way, user backup files are stored in multiple disparate locations, thereby providing storage redundancy to protect against backup file loss. The storage space reserved on each user's PC for use by the service in storing other user's information can be allocated in many ways, including: fixed size, dynamic size according to service needs, dynamic size according to available space (as the user fills up their hard drive, the service could reduce the amount of space it uses), subscription level (the user my get a price break for allocating more space to the service), as a multiple of the user's service-protected data, or a variety of other methods. The storage space can exists as a special partition on a user's hard drive or it can be one or more files under the control of the service.

Other embodiments of the present invention can keep a rolling history of data file changes so a user can restore a lost or corrupted file from any of a number of stored copies backed up at different times. An embodiment of the present invention can keep multiple copies of each version of a data file in one or more data storage locations.

In one embodiment, the invention backs up user information (or user-created content) in the form of user data files, and does not backup operating system or program files. Another embodiment of the invention selects the files to backup according to whether the files are in a specified list of directories, and/or whether the files are of a specified file type with encrypted or compressed format.

According to an embodiment of the invention, files can be backed up in their entirety initially on creation or after the service is initiated by the subscribed user. Subsequently when the files are modified, they are either incrementally or completely backed up. Either approach in the service can offer an option to allow for file configuration by the sophisticated user or an option requiring no configuration by the non-tech-savvy user. In another embodiment, the service, either centrally with the service controller and/or with the client software running on the each subscribed user PC, can keep a log of data files and their respective backup time stamp as well as signature histories. For example, for subsequent backups, the system compares a file's timestamp and/or signature to determine whether the file should be backed up.

In an specific embodiment, backup process can be performed on a time schedule which can be continuous and take place as soon as a file has changed, or they can be done in conjunction with virus scans procedure specified on each user PC. Data of these backup files can be transferred directly to a central data store within the central server at a 'snapshot' time or at a later time when network bandwidth is more available and potentially cheaper, such as late at night. In one embodiment, data transfer may also be directed by the service to be encrypted and sent to a peer personal computer either directly or through the central server of the service. Only the user who holds the encryption key will be able to decrypt the files and access the content. In another embodiment, centralized caching of data files can be provided, so as to allow the system to utilize service-dedicated storage on user's PCs even if those computers are off-line from time to time. In yet another embodiment, data transfer is throttled to minimize interference with other network or Internet activity such has VoIP communication and games.

The service can be used to transfer files from one PC to another. For example, when a user purchases a new PC and signs it for the service, all the files on an old PC can be restored to the new PC by the service. Files may also be transferred among multiple user-controlled personal computers. For example, the service allows the transfer of files among work, home, laptop, and family-entertainment personal computers. A user's multiple computers may be connected on a local area network (LAN) and/or may be Internet-connected. In another example, the service allows a user to select his or her own computer(s) to be the data storage used to back up their data. Thus, backed-up files from one of a user's personal computers are stored on one or more of their other computers. In this case, the user may direct the services to store the backup copies without encryption. However, in one embodiment, any files that are stored temporarily on the service's central servers for caching purposes will be encrypted during transport.

For sharable files, such as photos, video clips stored in user's entertainment PC, etc., that the user wants to share with other people (possibly publicly), the service can copy these files automatically to user-specified websites and/or PCs as part of the backup process.

The embodiments of the present invention can be implemented in connection with any device capable of storing data, including for example and without limitation, desktop computers, laptop computers, hand held computing devices such as a personal digital assistants (PDAs), and mobile phones.

The service can be advantageously, over conventional method, used by mobile device users to backup their files (including contact lists) automatically and protect them from data loss in the event they lose their mobile device. The service's client software running on the device can transfer backup information through a wireless data connection including but not limited to Short Message Service (SMS) messages.

The service can also be advantageously run as an enterprise solution administered by a company's internal Information Technology department. All user data, in this case, is stored within a company's firewall.

In one embodiment, a user can request the service to do an integrity check on their backed-up files. For example, this function compares the files currently on their personal computer with the backed-up versions. A report can be generated showing the files which failed the integrity check. The report also includes a change history (creation time/modification times/deletion time) for the superset of files on the user's personal computer and the user's backed-up files. In another example, this function can be used in conjunction with anti-virus software to recover files corrupted by malicious software such as viruses and worms.

According to a specific embodiment, a method of providing transparent file backup service based on networked computers includes establishing an online redundant array of independent disks (RAID) of a plurality of networked computers maintained by a central service controller on a server. The plurality of networked computers belong to one or more subscribed users. The method further includes storing backup files of each subscribed user on the online RAID. Each subscribed user dedicating at least a portion of storage spaces on corresponding computers to the online RAID for backup files of one or more alternative subscribed users. The central service controller in conjunction of a client software running on each user's computer is configured to coordinate backup file distribution and restoration.

According to another specific embodiment, a method of providing transparent file backup service based on multiple regional networked computers includes establishing an online RAID of a plurality of networked computers maintained by a central server. The plurality of networked computers respectively belongs to different subscribed users and is divided to separate groups of regional networked computers. Each group of regional networked computers maintained by a regional server is associated with a disparate geographic area. Each regional server is network-connected with the central server. The method further includes storing backup files of each subscribed user on the online RAID. Each subscribed user dedicates at least a portion of storage spaces on corresponding computers to the online RAID for backup files of one or more alternative subscribed users. Each regional server in conjunction of a client software running on each user's computer is configured to coordinate backup file distribution and restoration within corresponding group of regional networked computers. Additionally, all regional servers form a layer of networks capable of mutually storing backup files from alternate group of regional networked computers. Furthermore, the central server is configured to coordinate backup file distribution among the regional servers.

As a specific advantage of the invention, the service can be integrated into an operating system, installed as a software package, and/or integrated into other applications. The service can be paid for in any of several different ways including that, for example, the user can dedicate some of their hard drive spaces for use by the service or the service can show the user some advertisements (possibly related to the content of files on their computers). The service can be included in other revenue generating software applications. One possible such application is a search engine that provides search results biased toward user interests as determined from the type or content of files that the service is backing up. The algorithm for interest determination may consider how recently a user wrote or accessed files containing relevant keywords in its determination of current user interest.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of providing transparent file backup service based on networked computers, the method comprising:
    establishing an online redundant array of independent disks (RAID) of a plurality of networked computers maintained by a central service controller on a server, the plurality of networked computers belonging to one or more subscribed users;
    storing backup files of each subscribed user on the online RAID, each subscribed user dedicating at least a portion of storage spaces on corresponding computers to the online RAID for backup files of one or more alternative subscribed users, wherein the dedicated at least a portion of storage spaces are not accessible by the corresponding computers;
    wherein the central service controller in conjunction of a client software running on each user's computer is configured to coordinate backup file distribution and restoration;
    the central service controller being configured to utilize computers from a buddy list and wherein the central service controller is further configured to designate a set of alternative subscribed users for the storing backup files when the buddy list is not provided by a subscribed user, wherein the buddy list comprises a list of user-designated computers that are users included in the one or more subscribed users of the service.

2. The method of claim 1 wherein the establishing the online RAID further comprising:
    establishing connections between the central server and the plurality of networked computers by the one or more subscribed users via the client software;
    determining destinations of the backup files by the central server and the client software; and
    allocating a user-specified storage spaces of each of the plurality of networked computers as a partition of a hard drive or one or more files, wherein each allocated storage space is not accessible by the computer corresponding to that storage space.

3. The method of claim 2 wherein the establishing connections between the central service controller and the plurality of networked computers comprises connecting through at least one of a wide range network, a local area network, a home network, or Internet.

4. The method of claim 2 wherein the allocating the user-specified storage spaces comprises selecting a fixed size of hard disk spaces based on criteria including (1) a corresponding user-specific service requirement and (2) a dynamic size of hard disk spaces in exchange for categorizing user privilege ranking or discount charging.

5. The method of claim 2 wherein the online RAID is formed using peer-to-peer computer hard disk spaces and online cache.

6. The method of claim 1 wherein the storing the backup files further comprising:
    maintaining a backup log file to record a history of backup and/or restore process;
    and storing the backup files entirely or incrementally.

7. The method of claim 6 wherein the storing the backup files further comprising creating multiple copies of the backup files at different time point, each of the multiple copies of the backup files being stored on one or more hard disks of the networked computers at different locations.

8. The method of claim 6 wherein the storing the backup files may be performed continuously or at fixed schedules.

9. The method of claim 6 wherein the storing the backup files further comprises selecting files to backup from (1) a list of directories with file types or (2) file compression/encryption formats pre-specified by a corresponding user via the client software.

10. The method of claim 6 wherein the storing the backup files further comprising:
    performing a first file backup process by creating a first copy of all files selected by a corresponding user; and
    performing a second backup process by creating a second copy of all files that have been changed or created after the first backup process, the second copy including the first copy and/or only files that have been changed or newly created, the second backup process being initiated when at least one file has been changed or created by the corresponding user or when virus scanning is performed at corresponding computer.

11. The method of claim 1 wherein the backup files may be sent from a corresponding computer directly to one or more of the plurality of networked computers including the central server through wired or wireless network connection.

12. The method of claim 1 wherein the plurality of networked computer comprises one or more personal computers (PC) including desktop computers, laptop computers, family entertainment PC, one or more hand-held computing devices including personal digital assistants (PDA) and mobile phones, or a plurality of working computers in companies including individual workstations, data acquisition computers, process control computers, department and company servers.

13. The method of claim 1 further comprising caching at least a portion of the backup files at the central server to provide for storage of the at least a portion of the backup files on a subscribed user's storage space when the computer corresponding to the subscribed user is occasionally off-line.

14. A method of providing transparent file backup service based on multiple regional networked computers, the method comprising:
    establishing an online RAID of a plurality of networked computers maintained by a central server, the plurality of networked computers respectively belonging to different subscribed users and being divided to separate groups of regional networked computers, each group of regional networked computers maintained by a regional server being associated with a disparate geographic area, each regional server being network-connected with the central server;
    storing backup files of each subscribed user on the online RAID, each subscribed user dedicating at least a portion of storage spaces on corresponding computers to the online RAID for backup files of one or more alternative subscribed users, wherein the dedicated at least a portion of storage spaces are not accessible by the corresponding computers;
    wherein each regional server in conjunction of a client software running on each user's computer is configured to coordinate backup file distribution and restoration within corresponding group of regional networked computers;
    wherein all regional servers form a layer of networks capable of mutually storing backup files from alternate group of regional networked computers;
    wherein the central server is configured to coordinate backup file distribution among the regional servers wherein the central service controller being configured to utilize computers from a buddy list and wherein the central service controller is further configured to designate a set of alternative subscribed users for the storing backup files when the buddy list is not provided by a subscribed user, wherein the buddy list comprises a list of user-designated computers that are users included in the one or more subscribed users of the service.

* * * * *